United States Patent
Dickinson

(10) Patent No.: US 10,237,235 B1
(45) Date of Patent: Mar. 19, 2019

(54) SYSTEM FOR NETWORK ADDRESS TRANSLATION

(71) Applicant: Amazon Technologies, Inc., Reno, NV (US)

(72) Inventor: Andrew Bruce Dickinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 14/290,880

(22) Filed: May 29, 2014

(51) Int. Cl.
*H04L 29/12* (2006.01)

(52) U.S. Cl.
CPC ...... *H04L 61/2046* (2013.01); *H04L 61/2514* (2013.01); *H04L 61/2517* (2013.01); *H04L 61/2557* (2013.01); *H04L 61/2582* (2013.01)

(58) Field of Classification Search
CPC ......... H04L 29/12367; H04L 29/12377; H04L 61/2514; H04L 61/2517; H04L 61/2557; G06F 9/45533; G06F 9/45558
See application file for complete search history.

(56) References Cited

U.S. PATENT DOCUMENTS

| | | | |
|---|---|---|---|
| 9,276,816 B1* | 3/2016 | Conte | H04L 41/0893 |
| 2011/0047256 A1* | 2/2011 | Babu | H04L 29/12367 709/223 |
| 2013/0041987 A1* | 2/2013 | Warno | H04L 61/2535 709/220 |
| 2013/0185404 A1* | 7/2013 | Patel | H04L 61/2557 709/222 |
| 2013/0336208 A1* | 12/2013 | Billau | H04W 56/001 370/328 |
| 2016/0147548 A1* | 5/2016 | Itsumi | H04L 67/101 718/1 |

* cited by examiner

*Primary Examiner* — Yaotang Wang
(74) *Attorney, Agent, or Firm* — Thorpe North & Western, LLP

(57) ABSTRACT

A technology is described for a managed NAT (Network Address Translation) system. An example method of the NAT system may include receiving a request to launch a NAT system for a computing network that includes a number of computing devices. The NAT system may be used to allocate network addresses and ports for computing instances executing on one or more host computing devices according to a NAT policy. The NAT policy may include specifications that may be obtained and used to determine allocation of network addresses to the computing instances. The NAT system may then be associated with the computing devices included in the computing network and the NAT policy may be applied among the computing devices.

20 Claims, 9 Drawing Sheets

SYSTEM FOR NETWORK ADDRESS TRANSLATION

BACKGROUND

Computing devices often utilize a communication network or a series of communication networks to exchange data. Companies and organizations operate computer networks that interconnect a number of computing devices to support operations or provide services to other parties. The computing systems can be located in a single geographic location or located in multiple, distinct geographic locations (e.g., interconnected via private or public communication networks). For instance, data centers or data processing centers may include a number of interconnected computing systems that provide computing resources to customers of the data center. Using virtualization technologies, utilization of data center resources may be increased by configuring a single physical computing device to host one or more computing instances that appear to operate as independent computing devices to users of a data center.

For computing devices in a data center that communicate with external networks, a service provider can implement various types of network address translation (NAT) techniques in order to conserve the number of external or public IP (internet protocol) addresses used and to assist in protecting computing nodes within the data center. In one example network address translation implementation, a service provider may assign internal private network addresses to each computing device in a hosted computing network that facilitates communication within the hosted network. The service provider may then implement a network address translation computing device that correlates a finite set of external public network addresses and ports to each of the computing devices in the hosted computing network. The network address translation computing device operates as a gateway translating communications between the internal private network address of the computing devices in the hosted computing network and the finite set of externally public network addresses.

DETAILED DESCRIPTION

Figure 1:
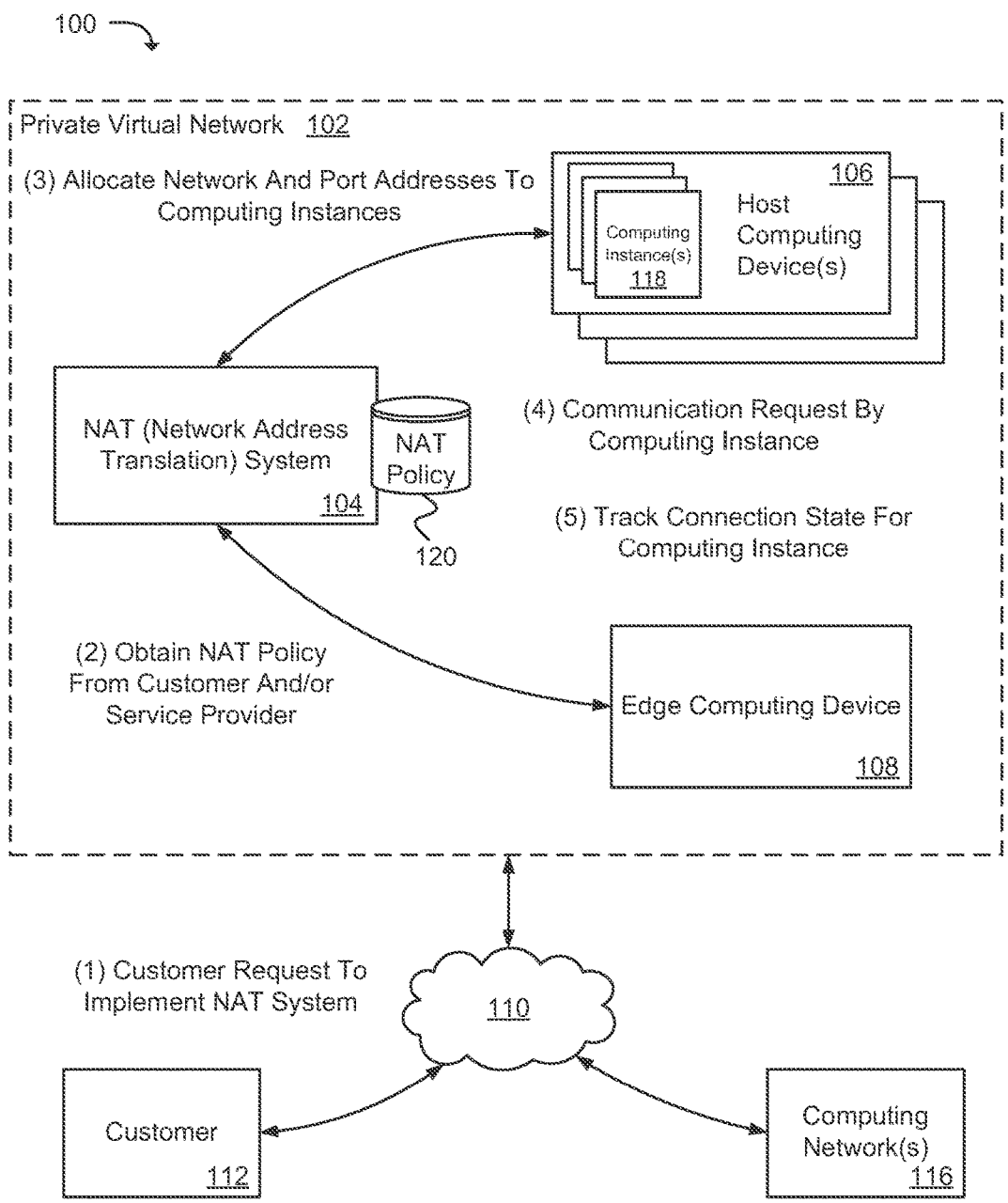
FIG. 1 is a diagram illustrating an example system and method for implementing a NAT system in a private virtual network.

A technology is described for a managed network and port translation system, herein referred to as a NAT system, which may include hardware and software (e.g., a plurality of computing instances on a hardware device acting as a hardware substrate) configured according to a NAT policy specified by a customer and/or a computing service provider. In one example configuration, a customer may request a NAT system for use in a computing network having one or more computing devices hosting computing instances by requesting that the NAT system be launched. The NAT system may act as a gateway for computing instance communications by remapping network address and port information for the computing instances from a private address space to an external address space according to a NAT policy. Computing devices included in the computing network may be associated with the NAT system, whereupon the NAT system may provide a network address translation service for computing instances included in the computing network or private virtual network. A NAT policy, provided by a customer and/or a computing service provider, may be used to configure the NAT system. The NAT policy may specify various parameters and settings used to configure the NAT system. For example, the NAT policy may specify a method used to provision network and port numbers to computing instances included in a computing network. For example, one method may include dividing port numbers (i.e., port bits) for a public network address between host computing devices. In one example, a public network address may be an openly accessible address in a computing network shared by two or more unrelated parties. Allocation of ports associated with a public network address to a computing instance may then be performed on an individual host computing device (i.e., at the physical device level). The connection state for computing instances on the host computing device may be managed locally on the host computing device using a local connection state table located on the host computing device. Alternatively, the connection state may be managed and stored by the NAT system in a decentralized fashion for each NAT system object that is created by a customer. Another example of a method used to provision network address and port numbers may include a central connection-state tracking system (e.g., a distributed system) that provisions ports associated with network addresses to computing instances, thereby establishing communication channels with external computing networks. For example, network traffic associated with a computing instance may be directed to the state tracking system, which selects a network address and port(s) for the computing instance and tracks the connection state of the computing instance via a connection state table. Because the central connection-state tracking system is a distributed system, failure of one component of the connection-state tracking system may not result in adversely affecting the entire computing network.

The technology may result in a managed NAT system that may be less susceptible to failures and more capable of scaling under increased loads as compared to a centralized NAT system implemented for a computing network via a single computing device or a single computing instance dedicated to providing a network address translation service. For example, existing NAT devices or NAT instances can be a centralized point of failure for a computing network. Furthermore, the technology of a NAT system may allow for a greater number of network connections due to the ability to scale beyond a single NAT device, whereas a centralized NAT device may have difficulty managing a large number of communication connections typically associated in larger computing networks due to a constraint on memory available to the NAT device.

FIG. 1 is a diagram illustrating a high level example of a private virtual network environment 100 in which a NAT system 104 may be implemented. The private virtual network environment 100 may be in communication with one or more external computing networks 116 via a communications network 110. The communications network 110 may be, for instance, a wide area network (WAN), a local area network (LAN), or a global communications network (e.g., the Internet). A customer 112 (e.g., such as a system administrator) may access a private virtual network 102 (i.e., via a client device) to request an instantiation of the NAT system (e.g., via a NAT object) and to configure the NAT system 104. A private virtual network 102 may be a subnet, a virtual private cloud, or any type of computing network that has been partitioned from a larger network.

The private virtual network 102 may include multiple physical computing devices, generally referred to as host computing devices 106. In one example, the host computing devices 106 may be capable of hosting multiple computing instances 118. At least some of the computing instances 118 may be provisioned to provide a variety of different desired functionalities. Examples of the types of desired functionality may include but are not limited to: database management, serving or distributing data or content (e.g., Web servers), managing load balancing or network resources, managing network connectivity or security, providing network addressing information, managing client or server redirection, or any other functionality associated with a data center.

In one example configuration, a customer may make a request that a computing service provider launch a NAT system 104 or NAT object for the customer's private virtual network 102 (e.g., a customer's private network space or subnet). The NAT system 104 may then be launched, and host computing devices 106 within the private virtual network 102 may be associated with the NAT system 104, such that network communications between the host computing devices 106 (i.e., including any respective computing instances 118) and external computing networks 116 are transmitted through the NAT system 104 and an edge computing device 108.

Once initiated, as illustrated in FIG. 1, the NAT system 104 may be a communication link in the private virtual network 102 for communication between host computing devices 106 and the computing instances 118 executing thereon and any edge computing devices 108. Although the NAT system 104 is depicted for the purpose of example as a single, standalone logical component in FIG. 1, the routines and steps performed by the NAT system 104 may be distributed among any number of components and executed in hardware or software. For example, multiple NAT systems 104 or NAT objects may be implemented in the private virtual network 102. Additionally, although the NAT system 104 is illustrated as logically associated within the private virtual network 102, the NAT system 104 may be located in a separate networked environment, or otherwise integrated into other components/systems of the private virtual network 102.

Various configurations of a NAT system may be available to a customer 112 to use with the customer's private virtual network. A first example of a NAT system configuration may be a centrally managed NAT system 104 as illustrated in FIG. 1 that may be associated with various computing devices (106 and 108) and computing instances 118 in a private virtual network 102. The NAT system 104 may be scalable (e.g., computing resources can be added or removed) according to network activity within the private virtual network 102.

A second example of a NAT system configuration may include a localized customer instantiated NAT system with NAT objects located and managed on computing instances within a customer's virtual network. For example, the NAT system may provide a customer interface via an application program interface (API) to enable access and management of the NAT objects on multiple computing instances. The API may load balance the NAT requests between the NAT objects and enable other management of the NAT system.

A third example of a NAT system configuration may include a customer initiated NAT object executing on multiple computing instances within a customer's private virtual network that have an application program interface (API) that may enable access to the NAT systems and the multiple computing instances may be managed using peer management. For example, the NAT objects executing on the computing instances may communicate with each other sharing information about the connection states of the computing instances, such as the allocation of port numbers for a public network address to the computing instances. In addition, connection state redundancy may be implemented among the computing instances so that when a computing instance fails, connection state information associated with the failed computing instance may be recovered. Alternatively, a customer oriented NAT object executing on multiple computing instances may include a master computing instance executing a NAT object that manages a plurality of NAT objects (e.g., slave NAT objects) executing on other computing instances in a private virtual network.

A fourth example of a NAT system configuration may include host computing devices within a private virtual network that manage connection states for computing instances executing on the host computing devices via a connection-state table located on an individual host computing device. Illustratively, each host computing device may track the connection state of computing instances executing on the host computing device. In addition, in at least one example, the NAT object on a host computing device may manage other aspects of a NAT system according to a NAT policy.

Returning to FIG. 1, the NAT system 104 may be configured using a NAT policy 120 that may be obtained from either of the customer 112 or a compute service provider. In a customer managed implementation of the NAT system 104, a customer 112 may provide and/or set parameters for the NAT policy 120 using a customer interface (e.g., a graphical user interface, command line interface, etc.) and/or by providing a NAT policy configuration file. Various features of the NAT system 104 may be configured by the customer 112 via the NAT policy 120. In one example, the NAT policy 120 may allow a customer 112 to manage the NAT system 104 by specifying a method for allocating public network addresses (e.g., an Internet Protocol address) to computing instances 118. For instance, one method may include dividing port numbers (e.g., port bits) for a public network address between a number of host computing devices 106. This may enable a set number of connections for each of the host computing devices. Alternatively, the port numbers for a public network address may be divided and provisioned to a number of computing instances 118, which may then establish network connections using the port numbers and locally track the state of the network connections.

As an illustration of a method that divides port numbers for a public network address between host computing devices 106, a public network address having a 16-bit port number may be divided between four host computing devices by providing each of the four host computing devices with 4-bits of freedom (e.g., 128 ports) for establishing communication channels for computing instances executing on the four host computing devices. Port bits may be divided equally among a number of host computing devices 106, or port bits may be allocated to the host computing devices 106 according to the size of the host computing devices 106. For example, a host computing device 106 having a large computing capacity (e.g., a number of processors and an amount of memory) may execute a greater number of computing instances 118 than a host computing device 106 having a small computing capacity. As a result, the large host computing device may be provided with a larger range of port bits as compared to a range of port bits provided to a small host computing device. A specific example of the above method is provided in relation to FIG. 5.

Another method may include a central connection-state tracking system having distributed network address translation (NAT) components assigned to host computing devices 106 that provision a network address and port numbers to computing instances 118 executing on the host computing devices 106. When additional NAT bandwidth or computing power is desired to service a customer's private virtual network or subnet, then additional NAT components (e.g., computing instances 118) may be launched and assigned external addresses to fulfill the requested NAT computing requests.

As an illustration of a method for a central connection-state tracking system for a NAT system, a connection-state tracking component, module or service may be assigned to one or more host computing devices 106. The connection-state tracking component provisions network addresses and ports to computing instances 118 executing on the host computing device 106. The components of the central connection-state tracking system may be distributed among a number of physical computing devices and executed in hardware or software. Alternatively, the central connection-state tracking system may be distributed over a number of computing instances 118. This may be done by mirroring the central connection-state tracking system over multiple peer computing instances 118 or a single computing instance 118 may act as a master to the computing instances 118.

Figure 6:
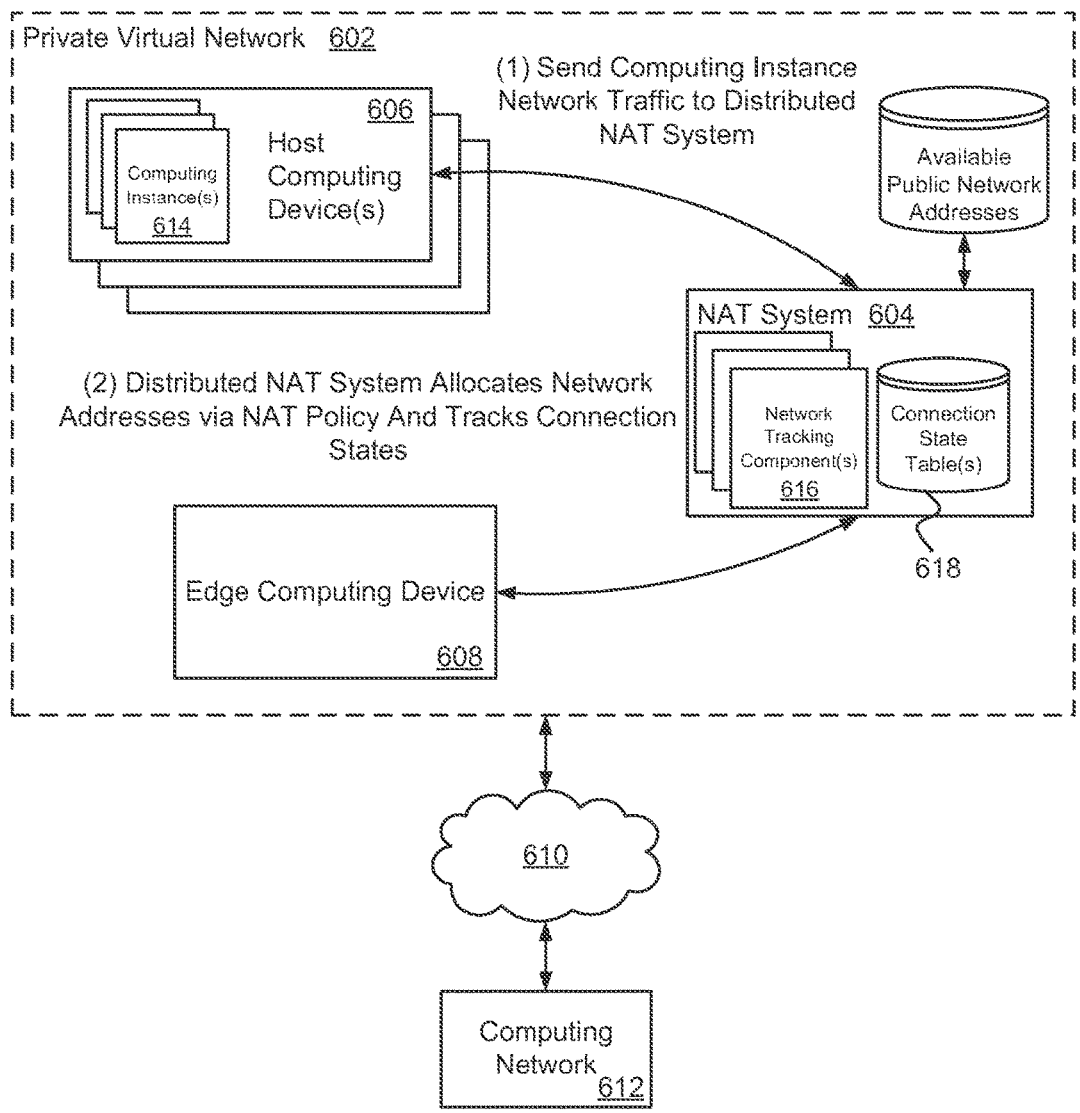
FIG. 6 is a diagram illustrating an example system and method for a managed NAT system utilizing a central connection-state tracking system.

Computing instances 118 may interface with an assigned connection-state tracking component in order to establish communications with an external computing network 116. In establishing communication with an external computing network 116, the connection-state tracking component may assign a public network address and ports to a computing instance 118 and track the communication via a connection state table. FIG. 6 provides one specific example of a central connection-state tracking system.

In a customer managed implementation of the NAT system 104, the customer 112 may specify, via the NAT policy 120, a desire for obtaining additional public network addresses when needed. Because port numbers for a public network address are finite, a second public network address may be needed when available port numbers for a first public network address have been allocated to the computing instances 118. For example, by way of the NAT policy, the customer 112 may specify whether additional public network addresses are obtained automatically, or whether the customer 112 is notified when an additional public network address may be needed, allowing the customer 112 to request an additional public network address from a computing service provider.

In an implementation where the NAT system 104 is managed by a computing service provider, parameters and settings of a NAT policy may be configured by the computing service provider. Features of the NAT policy managed by the computing service provider may include those described above (i.e., methods used to provision public network addresses and ports) as well as other automated NAT system features. As one example, the NAT system 104 may be configured to release a public network address when the public network address may no longer be needed. For example, the NAT system 104 may monitor allocation of port numbers for public network addresses assigned to a private virtual network of a customer. When port numbers for a public network address are no longer being used, or when allocation of port numbers for a public network address falls to a predetermined percentage, the public network address may be released back to a network address provisioning system.

As another example of a NAT system feature that may be managed by a computing service provider, the NAT system 104 may be configured to monitor the private virtual network 102 for host computing devices 106 and/or computing instances 118 added to the private virtual network 102 and associate the host computing devices 106 and/or the computing instances 118 with the NAT system 104. Likewise, the NAT system 104 may be configured to disassociate host computing devices 106 and/or computing instances 118 removed from the private virtual network 102. Thus, as the private virtual network 102 scales up or down (e.g., auto scales), the NAT system 104 may monitor the state of the private virtual network 102 for changes and provision network addresses accordingly. In yet another example of a NAT system feature managed by a computing service provider, the NAT system 104 may be configured to launch computing instances 118 for use by the NAT system 104 when additional computing resources and/or bandwidth is needed, such as when an additional public network address is obtained for a private virtual network 102.

In one example configuration, various features of the NAT system 104 may be configured by a customer 112, whereas other features of the NAT system 104 may be configured by a computing service provider. For example, a NAT policy may include specifications provided by a customer 112 and specifications provided a computing service provider. As a specific example, a customer 112 may want to manage public network addresses that are assigned to the customer's private virtual network 102, but may not wish to manage other features of a NAT system 104 (e.g., scaling issues). As a result, a NAT policy may indicate which features of the NAT system 104 are managed by the customer 112 (e.g., managing public network addresses) and which features are managed by a computing service provider (e.g., all features other than managing public network addresses).

Having obtained a NAT policy from a customer 112 and/or a computing service provider, the NAT system 104 may be associated with host computing devices 106 or computing instances 118 included in the private virtual network 102. For instance, the NAT system 104 may be associated with host computing devices 106, computing instances 118, edge computing devices 108 and other computing devices included in the private virtual network 102.

A customer 112 may specify which computing devices the NAT system 104 is associated with. For example, the customer 112 may specify that the NAT system 104 acts as an external communications gateway for all computing instances 118 in a private virtual network 102, or the customer 112 may specify a sub network and associate the sub network with the NAT system 104. The computing devices (e.g., host computing devices 106 and edge computing device 108) and/or computing instances 614 included in the private virtual network 102 (or sub network) may be instructed that communications between external computing networks 116 and the computing devices (including the computing instance 614) be routed through the NAT system 104. The NAT system 104 may provision network addresses and port numbers to computing instances 118 communicating with external computing networks 116, as described in relation to FIG. 6 and FIG. 7.

The connection state of computing instances 118 communicating with external computing networks 116 may be tracked using a translation table or a connection state table to map a public network address and port to a computing device (i.e., a computing device located in an external computing network 116). The connection state table may contain network address and port number tuples that maps a public network address and port to a private network address. As a specific example, a five-tuple network address connection state table may be used to define a computing instance in terms of a private network address, a private port number, a public network address, a public port number and a protocol tuple (e.g., TCP (Transmission Control Protocol), UDP (User Datagram Protocol), etc.).

Figure 2:
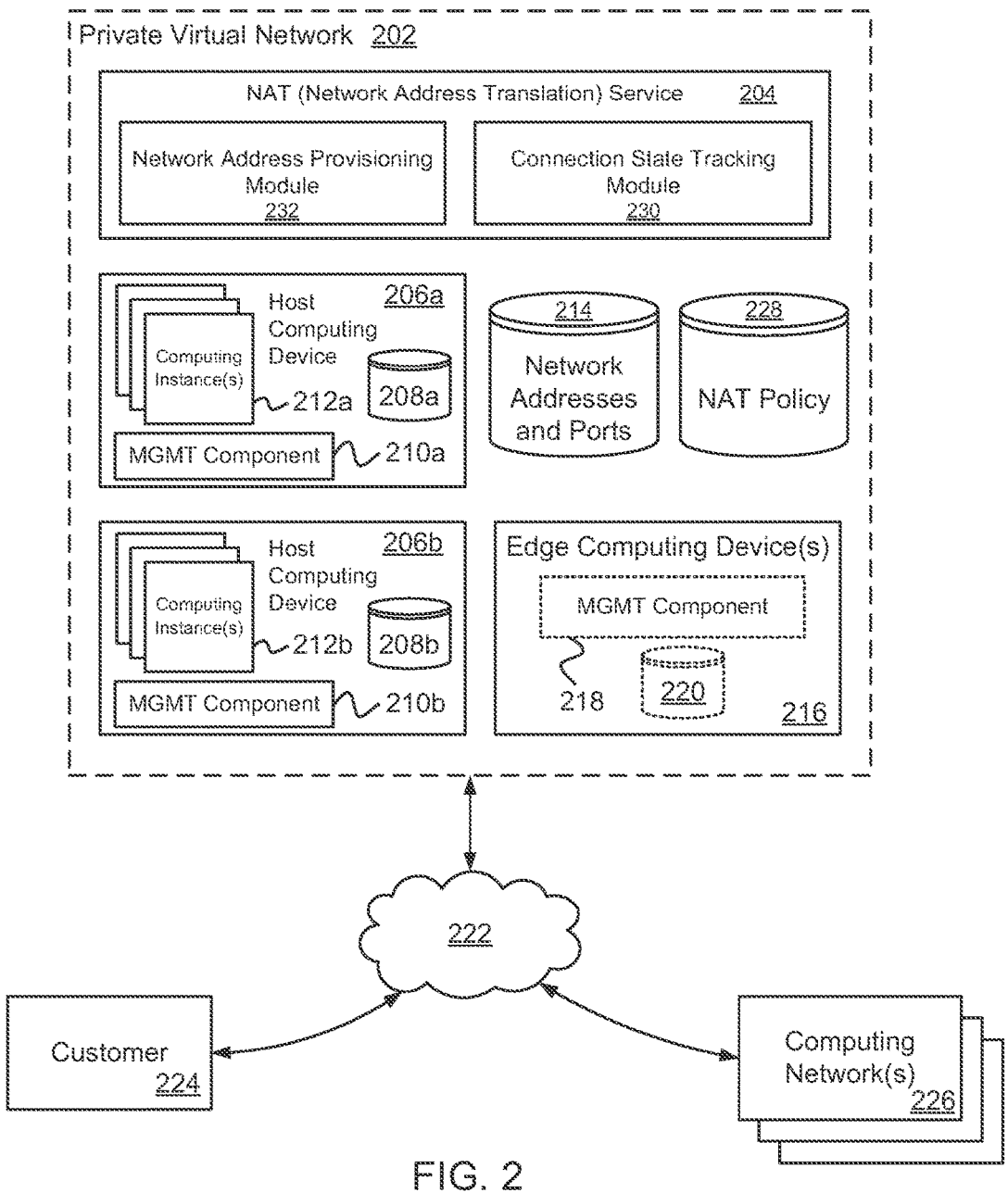
FIG. 2 is a block diagram illustrating an example system showing various components of the system that includes a managed NAT service.

FIG. 2 illustrates an example of various components of a private virtual network 202 on which the present technology may be executed. In the example configuration illustrated, the virtual network 202 may include a NAT service 204 (e.g., PAT port address translation service), various data stores for storing network addresses and ports 214 and a NAT policy 228, one or more host computing devices 206a-b executing a plurality of computing instance 212a-b, one or more edge computing devices 216, as well as other services, processes, systems, engines, or functionality not discussed in detail herein. A communications network 222 may provide a customer 224 with access to the private virtual network 202, as well as external computing networks 226 that are in communication with the computing instances 212a-b.

API calls, procedure calls or other network commands that may be made to the NAT service 104 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. The NAT service can provide NAT services using an underlying NAT system that is accessible and configurable via functional calls to the NAT service.

The NAT service 204 may be instantiated via a request from a customer 224 to translate network address and port information for computing instances 212a-b on the host computing devices 206a-b. Routines and steps performed by the NAT service 204 may be distributed among any number of computing components and executed in hardware and/or software. Also, multiple NAT services 204 may be implemented in the private virtual network 202. A customer may have multiple NAT services 204 or just a single NAT service.

Further, a customer 224 may manage the NAT service 204 by way of a NAT policy 228 that specifies parameters and settings for the NAT service 204. For example, a customer interface may allow the customer 224 to access and modify the NAT policy 228. When implementing the NAT service 204 for a private virtual network 202, the NAT policy 228 may be referenced to obtain any parameters and settings used to configure the NAT service 204. In a case where the customer 224 may not wish to manage the NAT service 204, a NAT policy 228 containing default settings as specified by a computing service provider may be used. Also, the NAT policy 228 may include a combination of customer 224 specified and computing service provider parameters and settings.

Generally, the NAT service 204 performs allocation of public network addresses (i.e., allocation of a network addresses and a port numbers) to host computing devices 206a-b and/or computing instances 212a-b executing on host computing devices 206a-b and performs stateful network address and port translation for communications between the computing instances 212a-b and external computing networks 226. The methods used to perform the above functions may be determined by the NAT policy 228. Illustratively, the NAT policy 228 may specify whether the NAT service 204 employs a method that divides port numbers for a public network address between host computing devices 206a-b using a network address provisioning module 232 or employs a central connection-state tracking system by way of a connection state tracking module 230. The central connection-state tracking system may be a distributed system having various stateful tracking components (not shown) located on multiple physical computing devices. A stateful tracking component may be assigned to one or more host computing devices 206a-b and manage allocation of public network addresses to computing instances 212a-b executing on the host computing devices 206a-b and manage the connection state of the computing instances 212a-b.

In addition to the NAT service 204, each host computing device 206a-b may include a local network address and port number management component 210a-b. In a NAT service 204 implementation where port numbers for a public network address are divided between host computing devices 206a-b, the local network address and port management component 210a-b may interface with the NAT service 204 to obtain network and port number information and store the network and port number information in a local memory device 208a-b. The local network address and port management component 210a-b may manage network address and port information by assigning a public network address that includes a port number to a computing instance 212a-b executing on a respective host computing device 206a-b and recording the assignment of the public network address in a connection state table maintained in a local memory device 208a-b of a respective host computing device 206a-b. By maintaining the connection state table on a host computing device 206a-b, failure of a single host computing device 206a-b may not adversely affect the connection states of other computing instances 212a-b on other host computing devices 206a-b. In another example, where public network addresses are provisioned by a NAT service 204 employing a central connection-state tracking system, the local network address and port number management component 210a-b may processes communication requests to and from computing instances 212a-b.

The private virtual network 202 may include one or more edge computing devices 216 for processing communication requests between host computing devices 206*a-b* and a plurality of external computing networks 226. The edge computing device 216 may correspond to any number of physical computing devices for facilitating communications to an external network, or a combination thereof. Additionally, the edge computing devices 216 may be implemented in a computing service environment as a computing instance on a host computing device. In some examples, an edge computing device 216 may include a local network address and port number management component 218 used to process communication requests to and from computing instances 212*a-b* in accordance with network address and port number information. The edge computing device 216 may include a data store 220 in which network address and port number information may be stored.

As mentioned above, various data stores 208*a-b*, 214, 220 and 228 may be found within the private virtual network 202. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data stores may include storage systems such as a SAN (Storage Area Network), cloud storage network, volatile or non-volatile RAM, optical media, or hard-drive type media. The data stores may be representative of a plurality of data stores as can be appreciated.

The network 222 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules and components may be discussed in connection with this technology and these processing modules and components may be implemented as computing services. In one example configuration, a module or component may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system.

An application program interface (API) may be provided for each module and/or component to enable a second module and/or component to send requests to and receive output from the first module and/or component. Such APIs may also allow third parties to interface with the module or component and make requests and receive output from the modules or components. API calls may be implemented using a RESTful API (e.g., a RESTful web service). While FIG. 2 illustrates an example of a system that may implement the techniques above, many other similar or different environments are possible. The example environments discussed and illustrated above are merely representative and not limiting.

Figure 3A:
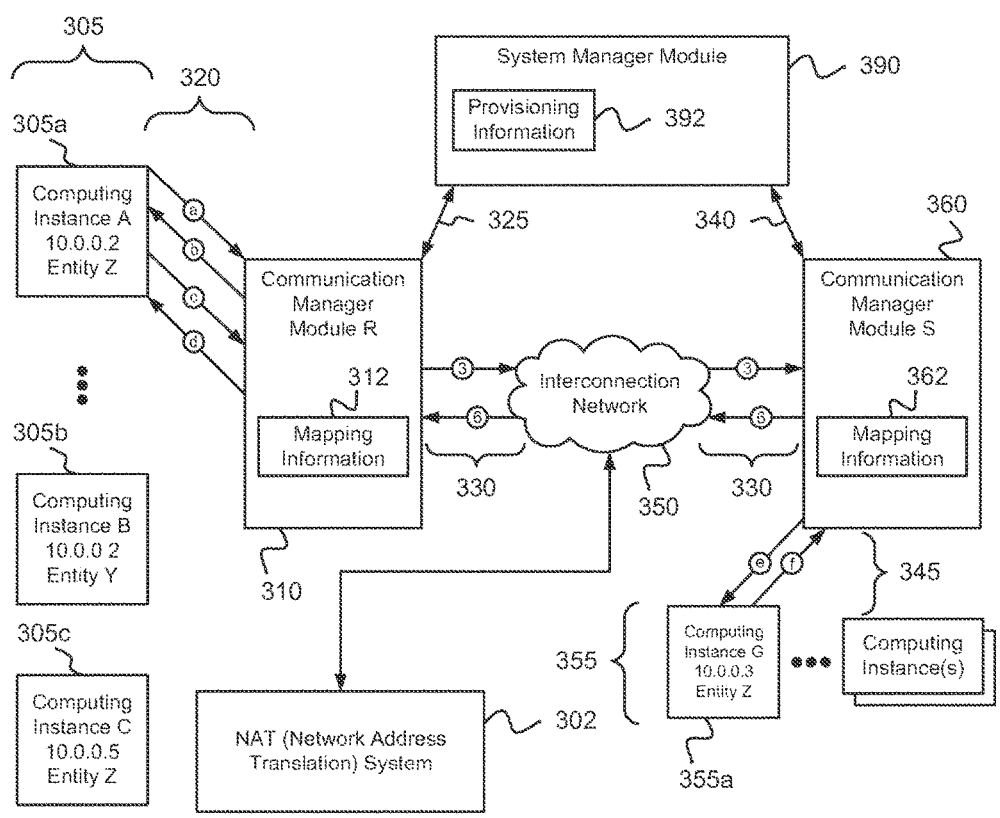
FIGS. 3a and 3b illustrate examples of managing communications between computing nodes that occur via a private virtual network.
Figure 3B:
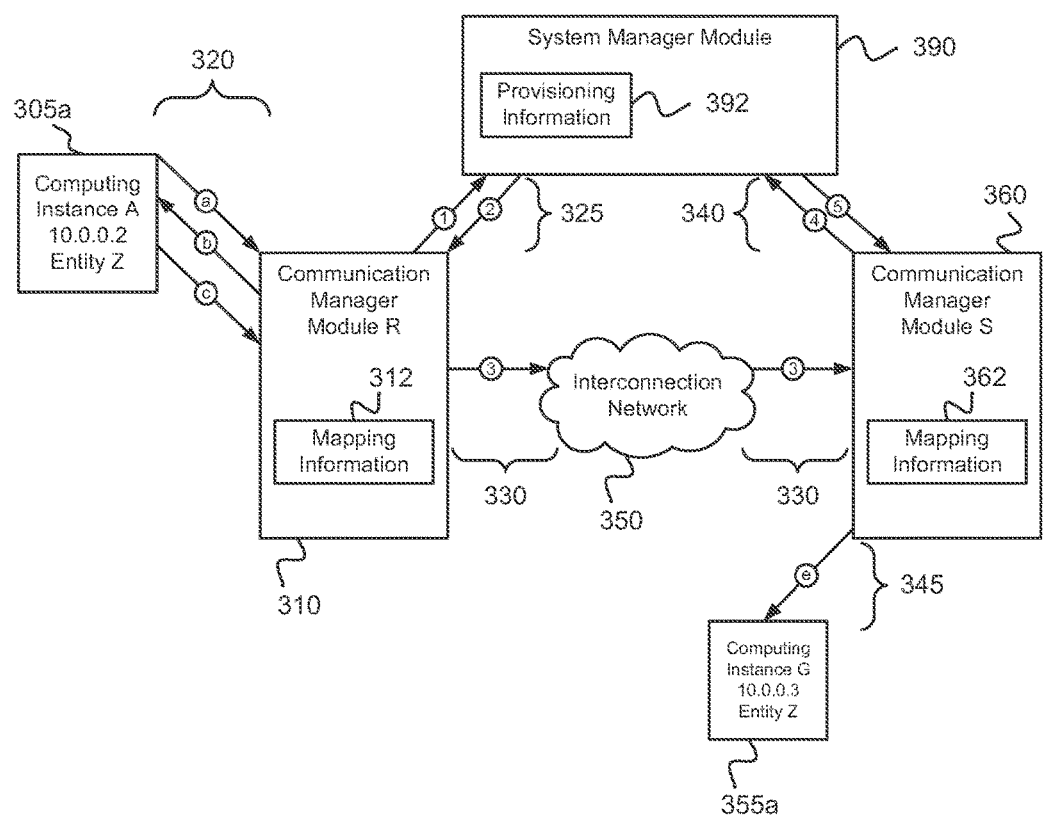

FIGS. 3*a* and 3*b* illustrate examples related to managing local communications between computing instances within a virtual network having an implemented managed NAT system 302, where the local communications occur via the virtual network overlaid on one or more physical computing networks. In particular, FIG. 3*a* illustrates various example computing instances 305*a-c* and 355 that may communicate with each other over one or more intermediate interconnection networks 350. The computing instances 305*a-c* and 355 may communicate with the NAT system 302 in a similar fashion. The computing instances 305 and 355 may be located on and executed by one or more host computing devices. In this example, the computing instances are operated on behalf of multiple distinct entities, such as multiple customers of a computing service, and a system manager module 390 manages the association of particular computing instances with particular entities and private virtual networks. The example computing instances of FIG. 3*a* include three computing instances executed on behalf of an example entity Z (i.e., computing instances 305*a*, 305*c* and 355*a*). In addition, other computing instances are operated on behalf of other entities, such as computing instance 305*b*.

In this example, the computing instances 305 are managed by an associated communication manager module R 310, and the computing instances 355 are managed by an associated communication manager module S 360. The communication manager module R may be part of a hypervisor or virtual machine monitor for a host computing device.

Each of the communication manager modules of FIG. 3*a* are associated with a sub-network of multiple physical network addresses, which the communication manager modules 310 and 360 manage on behalf of the communication manager module's associated computing instances. The interconnection network 350 forwards any communication with a destination network address in that range to communication manager module R with the initial 72 bits of the range specified, the communication manager module R may use the remaining available 56 bits to represent the computing instances that the communication manager module R manages and to determine how to process incoming communications whose destination network addresses are in that range.

For purposes of the example shown in FIG. 3*a*, computing instances 305*a*, 305*c* and 355*a* are part of a single virtual local network for entity Z, and have assigned IPv4 network addresses of "10.0.0.2", "10.0.0.5" and "10.0.0.3", respectively (if written in dotted hexadecimal form, "10.0.0.2" would instead be "A.0.0.2"). Because computing instance 305*b* is part of a distinct virtual network for entity Y, the computing instance 305*b* can share the same virtual network address as computing instance 305*a* without confusion. In this example, computing instance A wants to communicate with computing instance G, which computing instance A believes is part of a common local physical network with computing instance A, as the interconnection network 350 and communication manager modules are transparent to computing instances A and G in this example. In particular, despite the physical separation of computing instances A and G, the communication manager modules 310 and 360 operate so as to overlay the virtual local network for entity Z over the physical interconnection network 350 for communications between those computing instances, so that the lack of an actual local network is transparent to the computing instances A and G. In this example, the physical interconnection network 350 is an IPv6 substrate network on which IPv4 virtual networks are overlaid.

In order to send the communication to computing instance G, computing instance A exchanges various messages 320 with communication manager module R, despite being unaware of the existence of communication manager module R. In particular, in this example, computing instance A first sends an ARP (Address Resolution Protocol) message request 320-*a* that includes the local network address for computing instance G (i.e., "10.0.0.3") and that requests the corresponding hardware address for computing instance G (e.g., a 48-bit MAC, or Media Access Control, address). Communication manager module R intercepts the ARP request 320-*a*, and responds to computing instance A with a spoofed ARP response message 320-*b* that includes a dummy virtual hardware address for computing instance G.

To obtain the dummy virtual hardware address for the response message, the communication manager module R first checks a local store 312 of information that maps dummy virtual hardware addresses to corresponding IPv6 actual physical network addresses, with each of the dummy virtual hardware addresses corresponding to an IPv4 virtual network address for a particular entity's virtual network. If the local store 312 does not contain an entry for computing instance G (e.g., if none of the computing instances 305 have previously communicated with computing instance G, if a prior entry in local store 312 for computing instance G has expired, etc.), the communication manager module R interacts 325 with system manager module 390 to obtain the corresponding actual IPv6 physical network address for computing instance G on behalf of computing instance A. In particular, in this example, the system manager module 390 maintains provisioning information 392 that identifies where each computing instance is actually located and to which entity and/or virtual network the computing instance belongs. As discussed in greater detail with respect to FIG. 3*b*, the system manager module 390 determines whether the request from communication manager module R on behalf of computing instance A for computing instances G's actual IPv6 physical network address is valid, including whether computing instance A is authorized to communicate with computing instance G, and if so provides that actual IPv6 physical network address.

Communication manager module R receives the actual IPv6 physical network address for computing instance G from the system manager module 390, and stores this received information as part of a new entry for computing instance G 355*a* as part of mapping information for later use (optionally with an expiration time and/or other information). In addition, Communication manager module R determines a dummy virtual hardware address to be used for computing instance G (e.g., by generating an identifier that is locally unique for the computing instances managed by communication manager module R), stores that dummy virtual hardware address in conjunction with the received actual IPv6 physical network address as part of the new mapping information entry, and provides the dummy virtual hardware address to computing instance A as part of response message 320-*b*. By maintaining such mapping information 312, later communications from computing instance A to computing instance G may be authorized by communication manager module R without further interactions with the system manager module 390, based on the use of the dummy virtual hardware address previously provided by communication manager module R.

After receiving the response message 320-*b* from communication manager module R, computing instance A creates and initiates the sending of a communication to computing instance G, shown in FIG. 3*a* as communication 320-*c*. In particular, the header of communication 320-*c* includes a destination network address for destination computing instance G that is "10.0.0.3", a destination hardware address for destination computing instance G that is the dummy virtual hardware address provided to computing instance A in message 320-*b*, a source network address for sending computing instance A that is "10.0.0.2", and a source hardware address for sending computing instance A that is an actual or dummy hardware address that was previously identified to computing instance A.

Communication manager module R intercepts the communication 320-*c*, modifies the communication as appropriate, and forwards the modified communication over the interconnection network 350 to computing instance G. In particular, communication manager module R extracts the virtual destination network address and virtual destination hardware address for computing instance G from the header, and then retrieves the IPv6 actual physical network address corresponding to that virtual destination hardware address from mapping information 312. Similarly, the communication manager module R extracts the virtual source network address and virtual source hardware address for computing instance A from the header of the received communication, obtains an IPv6 actual physical network address corresponding to that virtual source hardware address (e.g., from a stored entry in mapping information 312, by interacting with the system manager module 390 to obtain that information if not previously obtained, etc.), and includes that actual physical network address as the source network address for the new IPv6 header. The Communication manager module R then creates a new communication 330-3 by modifying communication 320-*c* so as to replace the prior IPv4 header with the new IPv6 header (e.g., in accordance with SIIT (Stateless IP/ICMP Translation)), including populating the new IPv6 header with other information as appropriate for the new communication (e.g., payload length, traffic class packet priority, etc.). Thus, the new communication 330-3 includes the same content or payload as prior communication 320-*c*, without encapsulating the prior communication 320-*c* within the new communication 330-3. Furthermore, access to the specific information within the payload is not needed for such re-headering, such as to allow communication manager module R to handle communications in which the payload is encrypted without needing to decrypt that payload.

After communication manager module R forwards the modified communication 330-3 to the interconnection network 350, the interconnection network uses the physical IPv6 destination network address of the communication to route the communication to communication manager module S. In doing so, the devices of the interconnection network 350 do not use the portion of the destination network address that includes the embedded entity network identifier or embedded virtual network address, and thus do not need any special configuration to forward such a communication, nor even awareness that a virtual network is being overlaid on the physical interconnection network.

When communication manager module S receives communication 330-3 via the interconnection network 350, it performs actions similar to those of communication manager module R, but in reverse. In particular, in at least some embodiments, the communication manager module S verifies that communication 330-3 is legitimate and authorized to be forwarded to computing instance G, such as via one or more interactions 340 with the system manager module. If the communication is determined to be authorized (or if the authorization determination is not performed), the communication manager module S then modifies communication 330-3 as appropriate and forwards the modified communication to computing instance G. Additional details related to the verification of the communication 330-3 are discussed with respect to FIG. 3b.

In particular, to modify communication 330-3, communication manager module S retrieves information from mapping information 362 that corresponds to computing instance G, including the virtual hardware address used by computing instance G (or generates such a virtual hardware address if not previously available, such as for a new computing instance). Communication manager module S then creates a new communication 345-e by modifying communication 330-3 so as to replace the prior IPv6 header with a new IPv4 header (e.g., in accordance with SIIT). The new IPv4 header includes the virtual network address and virtual hardware address for computing instance G as the destination network address and destination hardware address for the new IPv4 header, the virtual network address and a dummy virtual hardware address for computing instance A as the source network address and source hardware address for the new IPv4 header, and includes other information as appropriate for the new communication (e.g., total length, header checksum, etc.). Thus, the new communication 345-e includes the same content or payload as prior communication 320-c and 330-3. Communication manager module S then forwards new communication 345-e to computing instance G.

After receiving communication 345-e, computing instance G determines to send a response communication 345-f to computing instance A, using the source virtual network address and source virtual hardware address for computing instance A from communication 345-e. Communication manager module S receives communication 345-e, and processes it in a manner similar to that previously described with respect to communication 320-c and communication manager module R. In particular, communication manager module S optionally verifies that computing instance G is authorized to send communications to computing instance A, and then modifies communication 345-f to create communication 330-6 by generating a new IPv6 header using mapping information 362. After forwarding communication 330-6 to the interconnection network 350, the communication is sent to communication manager module R, which processes the incoming communication in a manner similar to that previously described with respect to communication 330-3 and communication manager module S. In particular, communication manager module R optionally verifies that computing instance G is authorized to send communications to computing instance A and that communication 330-6 actually was sent by computing instance G, and then modifies communication 330-6 to create communication 320-d by generating a new IPv4 header using mapping information 312. Communication manager module R then forwards communication 320-d to computing instance A.

FIG. 3b illustrates some of the computing instances and communications discussed with respect to FIG. 3a, but provides additional details with respect to some actions taken by the communication manager modules 310 and 360 and/or the system manager module 390 to authorize communications between computing instances. For example, after computing instance A sends message 320-a to request a hardware address for computing instance G, communication manager module R may perform one or more interactions 325 with the system manager module 390 in order to determine whether to provide that information, such as based on whether computing instance A is authorized to communicate with computing instance G, as well as to determine a corresponding substrate physical network address for computing instance G based on interconnection network 350. If the communication manager module R has previously obtained that information and it remains valid (e.g., has not expired), then the interactions 325 may not be performed. In this example, to obtain the desired physical network address corresponding to computing instance G, communication manager module R sends a message 325-1 to the system manager module 390 that includes the virtual network addresses for computing instances A and G, and that includes an entity network identifier for each of the computing instances A and G. After the system manager module 390 determines that computing instance A is authorized to communicate with computing instance G, the system manager module 390 returns a response message 325-2 that includes the desired actual physical network address corresponding to computing instance G. In addition, in at least some examples, before sending the desired actual physical network address, the system manager module 390 may further verify that communication manager module R is authorized to send the message 325-1 on behalf of computing instance A, such as based on computing instance A being one of the computing instance to which communication manager module R is associated.

As previously noted with respect to FIG. 3a, after communication manager module S receives communication 330-3 intended for computing instance G via the interconnection network 350, communication manager module S may perform one or more interactions 340 with the system manager module 390 in order to determine whether to authorize that communication. In particular, in this example, to verify that the communication 330-3 is valid and authorized to be forwarded to computing instance G, communication manager module S first extracts the actual IPv6 destination network address and actual IPv6 source network address from the header of communication 330-3, and then retrieves the embedded entity network identifiers and virtual network addresses from each of the extracted IPv6 network addresses. The communication manager module S next exchanges messages 340 with system manager module 390 to obtain the corresponding actual IPv6 physical network address for the sending computing instance A on behalf of computing instance G, including a message 340-4 that includes the extracted virtual network addresses for computing instances A and G and the entity network identifier for each of the computing instances.

The system manager module 390 receives message 340-4, and returns a response message 340-5 that includes the actual physical network address corresponding to computing instance A. As previously discussed with respect to messages 325-1 and 325-2, in some examples the system manager module 390 and/or communication manager module S may further perform one or more other types of authorization determination activities, such as to determine that computing instance G is authorized to communicate with computing instance A, that communication manager module S is authorized to send the message 340-4 on behalf of computing instance G, etc. Communication manager module S then verifies that the returned physical network address in message 340-5 matches the source IPv6 network address extracted from the header of communication 330-3, so as to prevent attempts to spoof messages as being from computing instance A that are actually sent from other computing instances in other locations. Communication manager module S optionally stores this received information in message 340-5 as part of an entry for computing instance A in mapping information 362 for later use, along with computing instance A's virtual network address and a dummy virtual hardware address for computing instance A.

Figure 4:
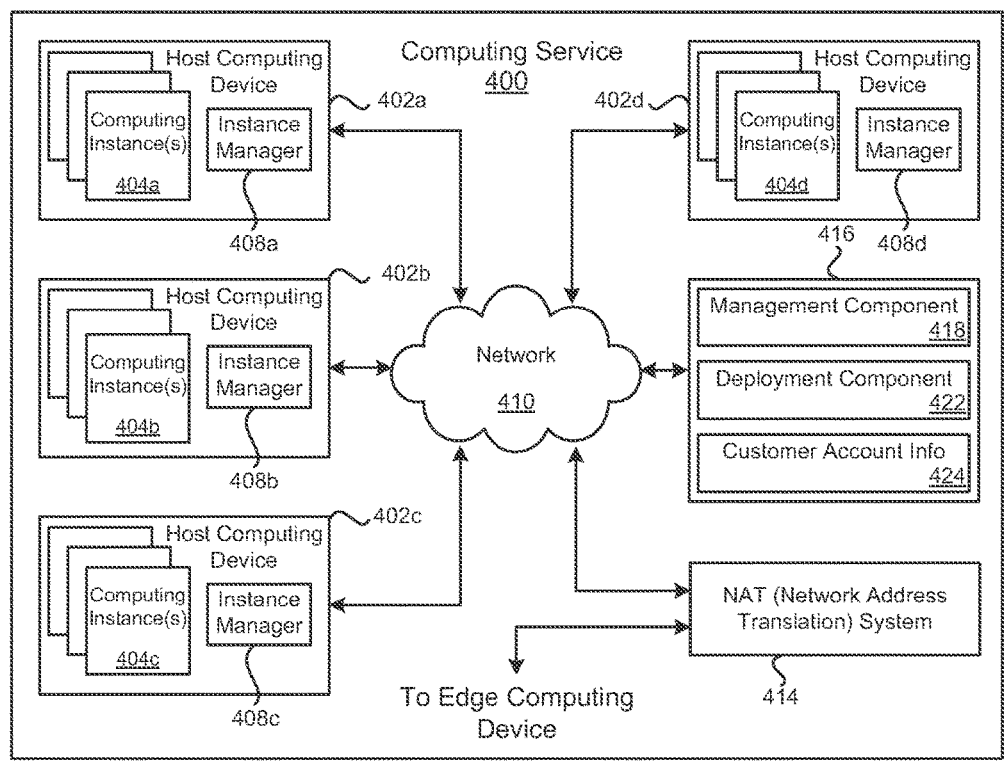
FIG. 4 is a block diagram that illustrates an example computing service environment that includes a managed NAT system.

FIG. 4 is a block diagram illustrating an example computing service 400 that may be used to execute and manage a number of computing instances 404a-d. In particular, the computing service 400 depicted illustrates one environment in which computing instances 404a-d communicating with external computing networks may interface with a managed NAT system 414 in order to communicate with the external computing networks.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of host computing devices 402a-d. While four host computing devices are shown, any number may be used, and large data centers may include thousands of host computing devices. The host computing devices 402a-d may execute computing instances 404a-d. Computing instances 404a-d may, for example, be virtual machines. A computing instance 404a-d may be an instance of a software implementation of a machine (i.e. a computer) that executes applications like a physical machine. Each of the host computing devices 402a-d may be configured to execute an instance manager 408a-d capable of executing the computing instances 404a-d. The instance manager 408a-d may be a hypervisor, virtual machine monitor (VMM), or another type of program configured to enable the execution of multiple computing instances 404a-d on a single host computing device 402a-d. Additionally, each of the computing instances 404a-d may be configured to execute one or more applications.

One or more computing devices may be reserved to execute software components for managing and facilitating the operation of the computing service 400 and the computing instances 404a-d. For example, a computing device may execute a NAT service 414 as described earlier. Another computing device 416 may execute various software components associated with the computing service 400. For example, a management component 418 may enable a customer to configure various features of the operation of the computing instances 404a-d purchased by a customer. For example, the customer may setup computing instances 404a-d and make changes to the configuration of the computing instances 404a-d. A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422. Customer account information 424 may include any desired information associated with a customer of the multi-tenant environment.

A network 410 may be utilized to interconnect computing devices included in the computing service 400. The network 410 may be a local area network (LAN) and may be connected to a Wide Area Network (WAN) or the Internet via an edge computing device, so that customers and/or users may access the computing service 400. The network topology illustrated in FIG. 4 has been simplified, many more networks and networking devices may be utilized to interconnect the various computing systems disclosed herein.

Figure 5:
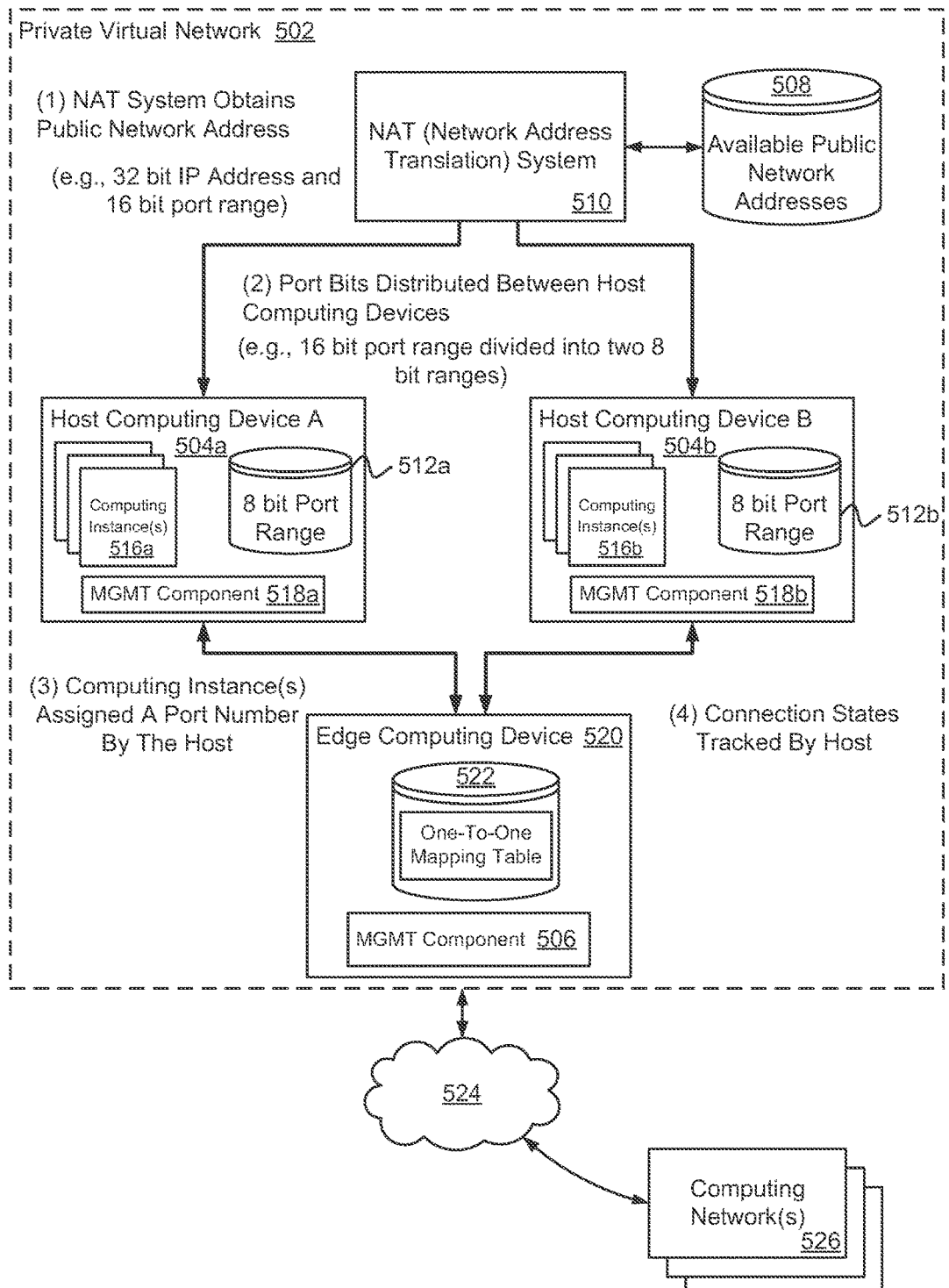
FIG. 5 is a diagram that illustrates an example system and method for provisioning network addresses and port numbers to host computing devices.

FIG. 5 is a diagram illustrating one example method for provisioning a public network address and ports using a managed NAT system 510 that distributes port numbers (e.g., port bits) for the public network address between host computing devices 504a-b within a private virtual network 502. When implementing a NAT system 510, a method for provisioning a public network addresses and ports may be specified, for example, via a NAT policy configured by a customer and/or a computing service operator. FIG. 5 illustrates one provisioning method that may be selected.

In one example configuration, the NAT system 510 may receive a configuration request to provision network address and port information for one or more hosted computing devices 504a-b included in the private virtual network 502. The request may identify one or more specific, instantiated host computing device(s) 504a-b or the request may be made in conjunction with a request to instantiate one or more host computing device(s) 504a-b. Additionally, the request may also identify one or more edge computing devices 520 or be made in conjunction with a request to instantiate one or more edge computing devices 520. In one example, the configuration of network address and port information can include a request of an available public network address 508 that will be assigned to the host computing device(s) 504a-b. For example, a customer (e.g., an administrator) associated with the private virtual network 502 may be presented with an interface (e.g., a graphical user interface) that identifies public network addresses 508 that are available to be utilized by the customer using the private virtual network 502. In another example, an available public network address 508 may be selected using an API (Application Programming Interface) call.

Configuration of the network address and port information may include a specification as to a number of hosted computing devices 504*a-b* that will share a specified public network address. Host computing devices 504*a-b* assigned to a shared public network address may be distinguished by associating each host computing device 504*a-b* with port information. For instance, each host computing device 504*a-b* may be configured to correspond to a defined range of the available ports. By way of illustrative example, some networking protocols, such as TCP (Transport Control Protocol) or UDP (User Datagram Protocol) utilize a 16 bit integer to define port information utilized to establish communication channels, generally referred to as sockets in conjunction with a network address. Accordingly, for each network address, there could be up to 65,535 different combinations of network address and ports. Accordingly, each host computing device 504*a-b* associated with a common public network address may be associated with a range of the total available ports in which the overall size of the range would represent that potential number of simultaneous connections any host computing device 504*a-b* can maintain. For example, utilizing 8-bits to define port ranges would allow each host computing device 504*a-b* up to 256 simultaneous connections available to computing instances 516*a-b* executing on the host computing device 504*a-b*, while utilizing 12-bits to define port ranges may allow each host computing device 504*a-b* up to 4,096 simultaneous connections available for use by computing instances 516*a-b*.

As an illustration, assume a computing network (e.g., a private virtual network 502) having two host computing devices 504*a-b* is assigned a public network address comprising a 32-bit network address and 16-bit port numbers. Additionally, assume that the 16-bit port numbers are divided between the two host computing devices 504*a-b*, giving each host computing device 504*a-b* 8-bits of freedom (e.g., 256 ports) for establishing communication channels for computing instances 516*a-b* executing on the host computing devices 504*a-b*. Each host computing device 504*a-b* can be defined in terms of a network address and port number tuple. By way of illustrative example, the first host computing device 504*a* can be defined by the network address and port number tuple, e.g., 128.227.1.1:4096-4351. Similarly, the second host computing device 504*b* can be defined by a different network address and port number tuple, e.g., 128.227.1.1:4351-4657. Because the two host computing devices 504*a-b* in the example share a common network address (e.g., 128.227.1.1), a local network address and port management component 506 in an edge computing device 520 can identify an appropriate host computing device 504*a-b* based on a port number selected from the range of port numbers associated with each host computing device 504*a-b*.

A range of port numbers allocated to a host computing device 504*a-b* may, in one example, be determined by a customer. Illustratively, the customer may indicate a method used to provision port number ranges and the method may be included in a NAT policy. As one example, the customer may select a method that provisions a range of port numbers according to a computing capacity size of a host computing device 504*a-b* (e.g., based on a number of processors and/or an amount of memory of a host computing device 504*a-b*).

As such, a larger range of port numbers may be provisioned to a large host computing device capable of executing a greater number of computing instances 516*a-b* as compared to a range of port numbers provisioned to a smaller host computing device. As another example, the customer may select a method that distributes a range of port numbers equally to the host computing devices 504*a-b* included in the private virtual network 502. Further, the customer may manually assign a selected range of port numbers to individual host computing devices 504*a-b*.

Having defined port ranges for each of the host computing device 504*a-b* (e.g., via a customer configuration request or via a NAT policy provided by a computing service provider), the NAT system 510 may then transmit the configuration, or a portion thereof, to local network address and port management components 518*a-b* on selected host computing devices 504*a-b* and to the local network address and port management component 506 on the edge computing device 520. The local network address and port management components 518*a-b* and 506 may manage locally maintained network address and port information 512*a-b* and 522, such as an IP table.

During execution of computing instances 516*a-b* on a host computing device 504*a-b*, one or more of the computing instances 516*a-b* may generate communication requests to components external to the private virtual network 502. As previously described, each computing instance 516*a-b* may be associated with a private network address that facilitates communications to the computing instances 516*a-b* within the private virtual network 502. However, the private network address is not useful for direct communications with external components, such as external computing networks 526.

In one example configuration, computing instances 516*a-b* are assigned public port information from the range of public port numbers allocated to the host computing device 504*a-b*. The local network address and port management component 518*a-b* of a host computing device 504*a-b* processes a communication request by including in the communication request port information assigned to the computing instance 516*a-b* generating the communication request. From the perspective of the host computing device 504*a-b* the outgoing communication request still identifies the private network address of the computing instance 516*a-b*.

Upon receipt of the communication request including the specified port number identifier, a receiving edge computing device 520 processes the communication request and translates the communication. Illustratively, the translation of the communication request relates to the modification of information identifying the private network address of the transmitting computing instance 516*a-b* to correspond to the public network address associated with the computing instance 516*a-b*. The receiving edge computing device 520 then causes the transmission of the translated communication request to a destination computing network 526 via a communications network 524. Although not illustrated, the transmission of the translated communication request can include the utilization of a number of additional components of the private virtual network 502.

Communications that are received at an edge computing device 520 from external computing networks 526 may identify the public network address and port number of a computing instance 516*a-b*. As described above, multiple computing instances 516*a-b* on a host computing device 504*a-b* may share a common public network address. Based on the received communication, a corresponding local network address and port management component 506 on the edge computing device 520 processes the communication request by translating the incoming communication request. For example, the local network address and port management component 506 may modify the information identifying the destination address of the communication request to the private network address of a computing instance 516a-b corresponding to the specified network address and port number in the incoming communication request. Once the communication request has been translated, the communication request may then be transmitted to a corresponding computing instance 516a-b and the received communication can be processed by the receiving computing instance 516a-b.

FIG. 6 is a diagram illustrating another example method for provisioning a public network address and port to a computing instance 614 using a managed NAT system 604. In this example, the NAT system 604 may include a distributed communication tracking system comprising a plurality of stateful network tracking components 616 (i.e., hardware and software, such as a server or computing instances) used to provision network addresses and ports to computing instances 614, and track communication connections for the associated computing instances 614. One or more network tracking components 616 may be associated with a private virtual network 602 and may assign public network addresses and ports to computing instances 614 establishing communication channels with external computing networks 612, and track the connection states for the computing instances 614.

In one example involving a private virtual network 602, computing instances 614 executing on host computing devices 606 that send network communications that are ultimately destined for external computing networks 612 through an intermediary network (e.g., the communications network 610) may send the network communication out to the edge of a private virtual network 602 as described earlier in relation to FIGS. 3a and 3b. The network communication may initially be routed to a network tracking component 616 that has been associated with the private virtual network 602. The tracking component 616 may be used to allocate a network address and port to the computing instance 614 and make an entry in a connection state table 618 (e.g., a network address and port number tuple) used to manage the connection state of the computing instance 614. The network communication may be transmitted to an edge computing device 608, which then transmits the network communication via a communications network 610 (e.g., the Internet) to an external computing network 612.

In a customer managed implementation of the NAT system 604, a configuration request may be received from a customer to associate a network tracking component 616 with computing instances 614 included in the private virtual network 602 (e.g., a private virtual subnet). The request may identify one or more specific, instantiated computing instances 614 or be made in conjunction with a request to instantiate one or more computing instances 614. Additionally, the request may also identify one or more edge computing devices 608 or be made in conjunction with a request to instantiate one or more edge computing devices 608. In one example, the configuration request may include a request for an available public network address to assign to the host computing device(s) 606 and computing instances 614. As described earlier, a customer may be presented with an interface (e.g., a graphical user interface) that identifies public network addresses that are available to be utilized by the private virtual network 602, or an available public network address may be selected using an API call.

Additional network tracking components 616 may be assigned to the private virtual network 602 to accommodate increases in a number of computing instances 614 producing network traffic and/or increases in an amount of network traffic throughput. Further, additional public network addresses may be obtained and utilized in conjunction with the additional network tracking components 616. For example, a customer may request that a first tracking component 616 and public network address be associated with a private virtual network 602. As network traffic emanating from the private virtual network 602 increases to a point that network and port numbers for the first public network address have been substantially exhausted, the customer may request a second tracking component 616 and a second public network address. Network traffic may then be divided between the first and the second network tracking components 616, thereby scaling the network traffic between the first and the second network tracking components 616.

In both a customer managed and a computing service provider managed implementation of the NAT system 604, allocation of network addresses and ports may be monitored (e.g., by a customer or by a system), as well as an amount of network traffic throughput, in order to determine whether additional network tracking components 616 should be assigned to the private virtual network 602. In one example, monitoring of a network tracking component 616 may include monitoring a tracking component's 616 throughput load. For example, a tracking component 616 may have N number of gigabits of throughput available to manage N number of NAT network connections. A threshold load percentage of throughput for a tracking component 616 may be specified by a customer and/or a computing service provider. As an illustration, a customer may specify (e.g., via a NAT policy) that upon 60%, 75%, 90%, etc. utilization of an assigned tracking component's 616 throughput, perform a specified action, such as: notifying a customer that the threshold load percentage has been reached, automatically assigning an additional tracking component 616 to the private virtual network 602, or some other action specified in the NAT policy (e.g., the NAT policy may be referenced to determine which action to take in response to the throughput load percentage being met or exceeded).

Further, allocation of port numbers for a network address to computing instances 614 may be monitored so that when a certain percentage of port numbers have been allocated, an action may be taken to obtain an additional public network address for the private virtual network 602. The percentage of allocated port numbers may be specified in a NAT policy, as well as an action to be performed when the percentage is met or exceeded. For instance, in a customer managed implementation of the NAT system 604, the customer may wish to be notified when the percentage of port numbers have been allocated so that the customer may manually request an additional public network address and then configure network components (e.g., firewalls) based on the additional public network address. In a computing service provider managed implementation of the NAT system 604, additional public network addresses may be automatically obtained and assigned to the private virtual network 602 when the percentage of allocated port numbers is met or exceeded.

Figure 7:
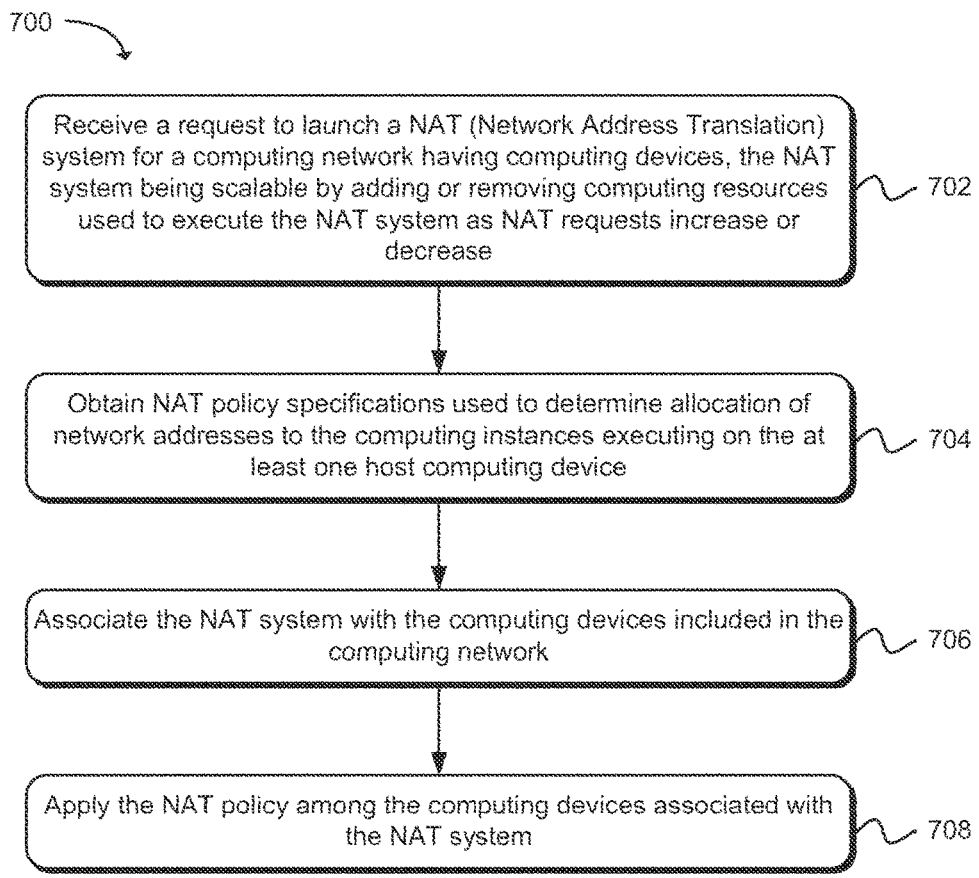
FIG. 7 is a flow chart illustrating an example method for a managed NAT system.

FIG. 7 is a flow diagram illustrating an example method 700 for a NAT system having a number of features that may be managed by a customer or a computing service provider via a NAT policy. Beginning in block 702, a request may be received to launch the NAT system for a computing network having a number of computing devices. The computing network may be a private virtual network or a sub network. The computing network may include a number of computing devices, such as, host computing devices that host a number of computing instances, and edge computing devices that utilize network and port address translation information to facilitate communication to and from the computing instances. The NAT system may be used to provision public network addresses and ports that correspond to an Internet Protocol address to the computing instances according to the NAT policy.

The request to launch the NAT system may be initiated by way of a customer interface provided by a computing service provider. A customer may access the customer interface and initiate a request to launch the NAT system. In one example use case, the customer may establish a private virtual network or a sub network of computing devices (e.g., host computing devices) and launch a NAT system for the private virtual network or sub network. In another example use case, the customer may, via the customer interface, select an option that modifies an existing NAT system to perform stateful network address translation according to specifications found in the NAT policy.

The NAT system may be scalable. For example, computing resources used to execute the NAT system may be added or removed as NAT requests increase or decrease. As an illustration, as NAT requests (e.g., network communications requesting network address translation) increase, the NAT system may launch additional computing instances and a load balancer may then provision the NAT requests between the newly launched computing instance and other computing instances performing the NAT system. As NAT requests to the NAT system decrease, computing instances performing the NAT system may be released.

As in block 704, NAT policy specifications may be obtained that are used to determine allocation of network address and port numbers to the computing instances executing on the host computing devices associated with the NAT system. Examples of NAT system features that can be managed by way of the NAT policy include, but are not limited to, a method used to provision network addresses and ports to computing instances (e.g., dividing port numbers between host computing devices or using a central connection-state tracking system), monitoring of network address and port utilization, monitoring of throughput utilization, obtaining and assignment of public network addresses, releasing public network addresses, auto scaling of the NAT system, specifying which features are to be managed by the customer and which features are to be managed by the computing service provider (e.g., hybrid management), as well as other NAT system features not specifically mentioned here.

As suggested above, the NAT policy may be maintained by the customer, by the computing service provider or by both. In a customer managed configuration example, the customer may access and modify the NAT policy using the customer interface provided by the computing service provider or by using API calls. The customer may select those features of the NAT system that the customer wishes to manage and provide settings and/or parameters for those features. Illustratively, features that a customer does not wish to manage may be managed by default settings provided by the computing service provider.

In examples where the NAT system is managed by a computing service provider, the computing service operator may specify parameters for the various NAT system features and may further institute various automated actions that may be controlled by way of the NAT policy. For example, the computing service provider may institute rules for: releasing public network addresses, customer specific rules by customer type that enable the computing service provider to tailor a NAT system to a customer (e.g., upgrade features of the NAT system for preferred customers), auto scaling the NAT system to conform to the size of the customer's computing network, as well as other rules not mentioned here.

As in block 706, the NAT system may be associated with the computing instances included in the computing network. When launching the NAT system, the customer may: specify a computing network with which to associate the NAT system, create a sub network and associate the NAT system with the sub network, select specific computing devices with which to associate the NAT system, or select specific computing instances to associate with the NAT system, for example. As will be appreciated, there may be many network configurations with which the NAT system may be associated, which are within the scope of this disclosure.

Having launched the NAT system and associated the computing components included in the computing network with the NAT system, as in block 708, the NAT policy may be applied to the NAT system and propagated out to the computing devices included in the computing network (e.g., the host computing devices and the edge computing devices). As an illustration, after launching the NAT system, the NAT policy may be retrieved to determine which parameters and settings to apply to the NAT system, which may then be propagated and applied to computing devices around the network (e.g., via a hypervisor). For example, the method used to provision public network and port numbers to computing instances may be determined and host computing devices and/or computing instances may be advised of the method. As a specific example where the NAT policy specifies a public network address and port provisioning method that divides port numbers for a network address among host computing devices, the NAT system may propagate the NAT policy by installing or activating a service on the host computing devices that manages a range of port numbers that can be assigned to computing instances executing on the host computing devices and manages one or more connection state tables for the computing instances.

The NAT system may be managed on an ongoing basis via the NAT policy by the customer and/or the computing service provider. As conditions change within the computing network environment, the NAT policy may be modified in accordance with the state of the computing network environment.

Figure 8:
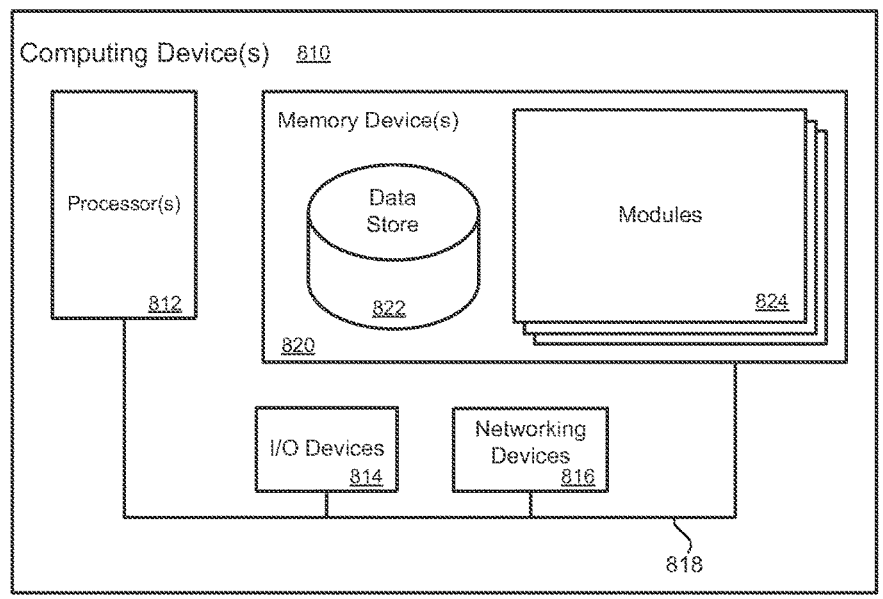
FIG. 8 is block diagram illustrating an example of a computing device that may be used to execute a method for a managed NAT system.

FIG. 8 illustrates a computing device 810 on which modules 824 of a NAT system may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring features of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   receive an API (Application Programming Interface) request from a customer of a computing service provider to launch a NAT (Network Address Translation) system for a private virtual network, wherein the private virtual network is overlaid on a physical network for a computing service environment, and wherein the private virtual network includes computing instances executed on host computing devices, and wherein the host computing devices are connected to the physical network,
   wherein the NAT system is scalable by adding or removing NAT components used to execute the NAT system that acts as a gateway for the computing instances by remapping network addresses and port information for the computing instances from a private address space to a public address space according to a NAT policy having customer defined NAT policy specifications;
   obtain the customer defined NAT policy specifications configured for the private virtual network from the customer via the API, wherein the customer defined NAT policy specifications specify how public network addresses and port numbers associated with an external network space are allocated to the computing instances executing within the private virtual network, wherein allocation of the port numbers for a first public network address to the computing instances is monitored and a second public network address is requested when allocation of the port numbers for the first public network address reaches a predetermined percentage of the port numbers specified in the customer defined NAT policy specifications;
   obtain specifications from the customer identifying the computing instances to associate with the NAT system; and
   apply the NAT policy to communications for the computing instances associated with the NAT system.

2. A non-transitory machine readable storage medium as in claim 1, wherein instructions that when executed by the processor receive a request from a customer to launch the NAT system, further comprise a request from a customer to launch a NAT system that allocates a public network address and a sub-range of port numbers to a host computing device, wherein a stateful translation table is maintained on the host computing device that maps a computing instance executed by the host computing device to the public network address and port number.

3. A non-transitory machine readable storage medium as in claim 1, wherein instructions that when executed by the processor receive a request from a customer to launch the NAT system, further comprise a request from a customer to launch a distributed NAT system for the private virtual network that manages a connection state for a computing instance by assigning a public network address and port number tuple to the computing instance and tracking a connection state of the computing instance, wherein a NAT component included in the distributed NAT system is associated with a plurality of computing instances.

4. A computer implemented method, comprising:
   under control of one or more computer systems configured with executable instructions, receiving a request to launch a NAT (Network Address Translation) system for a private virtual network, wherein the private virtual network is overlaid on a physical network for a computing service environment, and the private virtual network includes computing instances that are executable on host computing devices, and the host computing devices are connected to the physical network, and wherein the NAT system is scalable by adding or removing assigned NAT components used by the NAT system as NAT requests increase or decrease;
   obtaining customer defined NAT policy specifications from a NAT policy, the customer defined NAT policy specifications being configured for the private virtual network, and the customer defined NAT policy specifications determine allocation of public network addresses and port numbers to the computing instances executing on the at least one host computing device, wherein allocation of the port numbers for at least one public network address to the computing instances is monitored and an additional public network address is requested when allocation of the port numbers for the at least one public network address reaches a predetermined percentage of the port numbers specified in the customer defined NAT policy specifications;
   associating the NAT system with the computing instances included in the private virtual network; and
   applying the NAT policy to communications for the computing instances associated with the NAT system.

5. A method as in claim 4, further comprising scaling the NAT system according to a size of the private virtual network by launching additional NAT components used by the NAT system when the size of the private virtual network increases and releasing computing resources used by the NAT system when the size of the private virtual network decreases.

6. A method as in claim 4, wherein receiving a request to launch the NAT system further comprises receiving a request to launch a stateful NAT system that uses a translation table to map a public network address to a computing device, wherein the translation table contains public network addresses and port number tuples.

7. A method as in claim 4, wherein obtaining the customer defined NAT policy specifications further comprises obtaining the customer defined NAT policy specifications from a customer via a customer interface used to manage the NAT policy, the customer defined NAT policy specifications indicating how available public network addresses and port numbers are allocated to computing devices located within the private virtual network.

8. A method as in claim 4, wherein obtaining the customer defined NAT policy specifications further comprises a customer defined NAT policy specification for a range of port numbers that are available to a host computing device executing a plurality of computing instances.

9. A method as in claim 4, wherein obtaining the customer defined NAT policy specifications further comprises a customer defined NAT policy specification for a range of port numbers that are available to a host computing device based at least in part on a computing capacity size of the host computing device.

10. A method as in claim 4, further comprising enabling a customer via an interface to monitor an allocation of port numbers for a first public network address to computing instances within the private virtual network.

11. A method as in claim 4, wherein receiving the request to launch the NAT system further comprises receiving a request to launch a NAT system managed according to a NAT policy set by a computing service provider.

12. A method as in claim 4, further comprising:
requesting an allocation of a second public network address from a network address provisioning system when allocation of port numbers for a first public network address reaches a predetermined percentage of total port numbers available for the first public network address; and
allocating a port number for the second public network address to a computing instance when the computing instance is launched.

13. A method as in claim 4, further comprising:
monitoring allocation of port numbers for a second public network address to computing instances within the private virtual network; and
releasing the second public network address back to a network address provisioning system when allocation of port numbers for a first public network address falls to a predetermined percentage.

14. A method as in claim 4, wherein the NAT policy includes specifications provided by a customer and specifications provided by a computing service provider.

15. A method as in claim 4, wherein the public network addresses and the port numbers information that corresponds to an Internet Protocol address.

16. A method as in claim 4, wherein receiving a request to launch the NAT system further comprises a request to launch a NAT system that allocates a public network address and a sub-range of port numbers to a host computing device, wherein a translation table is maintained on the host computing device that maps a computing instance executed by the host computing device using the public network address and port number tuples.

17. A method as in claim 4, wherein receiving a request to launch the NAT system further comprises a request from a customer to launch a centralized NAT system for the private virtual network that manages a connection state for a computing instance by assigning a public network address and port number tuple to the computing instance and tracking a connection state of the computing instance.

18. A system comprising:
a processor;
a memory device including instructions that, when executed by the processor, cause the system to:
launch a NAT (Network Address Translation) system for a private virtual network, wherein the private virtual network is overlaid on a physical network for a computing service environment and the private virtual network includes computing instances that are executable on host computing devices and the host computing devices are connected to the physical network,
wherein the NAT system is scalable by adding or removing NAT components used by the NAT system as NAT requests increase or decrease, and the NAT system acts as a gateway for the computing instances by remapping network address and port number information for the computing instances from a private address space to a public address space according to a NAT policy;
obtain customer defined NAT policy specifications for the NAT policy configured for the private virtual network, wherein the NAT policy specifies public network address and port number allocation for the computing instances included in the private virtual network, wherein allocation of the port numbers for a first public network address to the computing instances is monitored and a second public network address is requested when allocation of the port numbers for the first public network address reaches a predetermined percentage specified in the customer defined NAT policy specifications;
associate the NAT system with the computing instances included in the private virtual network; and
propagate the NAT policy among the computing instances associated with the NAT system.

19. A system as in claim 18, wherein the memory device includes instructions that, when executed by the processor, causes the system to execute a network GUI (Graphical User Interface) console that enables a customer to monitor allocation of the port numbers for the first public network address to host computing devices within the private virtual network.

20. A system as in claim 18, wherein the memory device includes instructions that, when executed by the processor, causes the system to request the second public network address from a network address provisioning system when allocation of port numbers for the first public network address reaches the predetermined percentage.

* * * * *